United States Patent
Kondo et al.

(10) Patent No.: US 8,876,196 B2
(45) Date of Patent: Nov. 4, 2014

(54) CAB FRAME STRUCTURE FOR CONSTRUCTION MACHINE

(75) Inventors: Shigeki Kondo, Yokohama (JP); Masanori Sato, Fujisawa (JP)

(73) Assignee: Press Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 13/811,542

(22) PCT Filed: Jul. 21, 2011

(86) PCT No.: PCT/JP2011/066589
§ 371 (c)(1),
(2), (4) Date: Jan. 22, 2013

(87) PCT Pub. No.: WO2012/014781
PCT Pub. Date: Feb. 2, 2012

(65) Prior Publication Data
US 2013/0119708 A1    May 16, 2013

(30) Foreign Application Priority Data

Jul. 29, 2010    (JP) ................................. 2010-170767

(51) Int. Cl.
*B60J 7/00*    (2006.01)
*E02F 9/16*    (2006.01)
(52) U.S. Cl.
CPC .. *E02F 9/16* (2013.01); *E02F 9/163* (2013.01)
USPC ................................................... 296/190.08
(58) Field of Classification Search
USPC ............. 296/190.08, 190.01, 190.03, 190.04, 296/190.09, 190.11, 203.01, 203.02, 205, 296/187.09, 190.06; 180/89.12, 898.3
See application file for complete search history.

(56) References Cited

U.S. PATENT DOCUMENTS 5,096,253 A *    3/1992  Jo et al. ....................... 296/190.1
5,577,795 A *    11/1996  Shinsen ................... 296/190.11
(Continued)

FOREIGN PATENT DOCUMENTS

JP    2002-088810    3/2002
JP    2002-088812    3/2002
(Continued)

OTHER PUBLICATIONS

PCT International Search Report, ISA/JP, mailed on Oct. 25, 2011 for PCT Application No. PCT/JP2011/066589.

*Primary Examiner* — Kiran B Patel
(74) *Attorney, Agent, or Firm* — Louis Woo

(57) ABSTRACT

Object
In a cab frame structure for a construction machine in which a front pillar and a roof pillar are configured by one tubular material, the cab frame structure for the construction machine in which an attachment position of a front header can be reversibly raised and an upward viewing angle of a driver is enlarged is provided.
Solving Means
A front pillar 1 and a roof pillar 2, which constitute a cab frame of the construction machine, are configured by one tubular material 9 having a curved portion 10 at a joint between them, and by making a curvature radius of a curve outer side 10a in the curved portion 10 smaller than a curvature radius of a curve inner side 10b, a space 12 to raise an accommodation position of a top end 7x of a front window unit 7 is formed in the curved portion 10. A front header 4 is arranged at the position of the top end 7x of the front window unit 7 accommodated in the space 12. With this configuration, the attachment of the front header 4 can be reversibly raised, and an upward viewing angle θ2 of a driver can be expanded.

18 Claims, 8 Drawing Sheets

(56) References Cited

U.S. PATENT DOCUMENTS

| | | | |
|---|---|---|---|
| 6,394,212 B1 * | 5/2002 | Takano et al. | 180/89.13 |
| 6,409,254 B2 * | 6/2002 | Tiziano | 296/190.08 |
| 6,568,746 B2 * | 5/2003 | Sakyo et al. | 296/190.08 |
| 6,582,010 B2 * | 6/2003 | Sakyo et al. | 296/190.08 |
| 6,772,544 B2 * | 8/2004 | Takemura et al. | 37/347 |
| 7,048,082 B2 * | 5/2006 | Mori et al. | 180/89.12 |
| 7,140,670 B2 * | 11/2006 | Olson | 296/190.08 |
| 7,246,846 B2 * | 7/2007 | Shioji et al. | 296/190.11 |
| D548,753 S * | 8/2007 | Kim | D15/30 |
| D549,245 S * | 8/2007 | Antonetti | D15/30 |
| D555,677 S * | 11/2007 | Kuwae et al. | D15/30 |
| D571,073 S * | 6/2008 | Buchmann et al. | D34/35 |
| D571,074 S * | 6/2008 | Buchmann et al. | D34/35 |
| 7,413,241 B2 * | 8/2008 | Murakami et al. | 296/190.08 |
| D594,480 S * | 6/2009 | Gicquel et al. | D15/30 |
| 7,695,055 B2 * | 4/2010 | Tsukamoto | 296/190.11 |
| 7,806,214 B2 * | 10/2010 | Tsukui et al. | 180/89.17 |
| 7,959,219 B2 * | 6/2011 | Namura et al. | 296/190.08 |
| 8,096,052 B2 * | 1/2012 | Hampel | 29/897.2 |
| 8,235,457 B2 * | 8/2012 | Yamamoto et al. | 296/190.03 |
| 8,240,745 B2 * | 8/2012 | Yamamoto et al. | 296/190.03 |
| 8,496,282 B2 * | 7/2013 | Murakami et al. | 296/65.05 |
| 2002/0040820 A1 * | 4/2002 | Takano et al. | 180/89.19 |
| 2002/0149232 A1 * | 10/2002 | Sakyo et al. | 296/190.08 |
| 2002/0153748 A1 * | 10/2002 | Sakyo et al. | 296/190.08 |
| 2003/0025357 A1 * | 2/2003 | Fischer et al. | 296/190.08 |
| 2005/0006157 A1 * | 1/2005 | Shioji et al. | 180/89.13 |
| 2006/0017308 A1 * | 1/2006 | Kojima et al. | 296/190.03 |
| 2007/0024088 A1 * | 2/2007 | Mori et al. | 296/190.08 |
| 2007/0131262 A1 * | 6/2007 | Ishii et al. | 134/123 |
| 2007/0132277 A1 * | 6/2007 | Ishii et al. | 296/190.01 |
| 2007/0187991 A1 * | 8/2007 | Mori | 296/187.12 |
| 2009/0101375 A1 * | 4/2009 | Tsukui et al. | 172/776 |
| 2009/0115223 A1 * | 5/2009 | Tsukamoto | 296/190.04 |
| 2009/0127888 A1 * | 5/2009 | Tsukamoto et al. | 296/190.03 |
| 2009/0134665 A1 * | 5/2009 | Tsukamoto | 296/190.11 |
| 2010/0102594 A1 * | 4/2010 | Kimura et al. | 296/190.01 |
| 2010/0212297 A1 * | 8/2010 | Kamiya et al. | 60/286 |
| 2010/0219008 A1 * | 9/2010 | Isaka et al. | 180/68.1 |
| 2010/0236855 A1 * | 9/2010 | Matsushita et al. | 180/69.2 |
| 2010/0301634 A1 * | 12/2010 | Ansorge | 296/190.03 |
| 2011/0025097 A1 * | 2/2011 | Yamamoto et al. | 296/190.03 |
| 2011/0057479 A1 * | 3/2011 | Namura et al. | 296/190.08 |
| 2011/0088637 A1 * | 4/2011 | Hirasawa et al. | 123/41.31 |
| 2011/0162908 A1 * | 7/2011 | Masuda et al. | 181/211 |
| 2011/0181074 A1 * | 7/2011 | Namura et al. | 296/190.01 |
| 2012/0061995 A1 * | 3/2012 | Maeba et al. | 296/193.06 |
| 2012/0067661 A1 * | 3/2012 | Kashu et al. | 180/309 |
| 2012/0134768 A1 * | 5/2012 | Kimura et al. | 414/687 |
| 2012/0187721 A1 * | 7/2012 | Nishimura et al. | 296/190.03 |
| 2012/0205945 A1 * | 8/2012 | Taylor et al. | 296/190.08 |
| 2013/0009423 A1 * | 1/2013 | Yamamoto et al. | 296/190.08 |
| 2013/0011232 A1 * | 1/2013 | Tabeta et al. | 414/694 |
| 2013/0058747 A1 * | 3/2013 | Kimura et al. | 414/687 |
| 2013/0078068 A1 * | 3/2013 | Tanaka et al. | 414/687 |
| 2013/0078071 A1 * | 3/2013 | Noguchi et al. | 414/719 |
| 2013/0257099 A1 * | 10/2013 | Kamimae et al. | 296/190.09 |

FOREIGN PATENT DOCUMENTS

| | | |
|---|---|---|
| JP | 2004-090039 | 3/2004 |
| JP | 2005-247006 | 9/2005 |
| JP | 2007-099236 | 4/2007 |

* cited by examiner

CAB FRAME STRUCTURE FOR CONSTRUCTION MACHINE

TECHNICAL FIELD

The present invention relates to a cab frame structure for a construction machine, in which a front pillar and a roof pillar that configure the cab frame of the construction machine, are configured by one curved tubular material.

BACKGROUND ART

As shown in FIG. 1 and FIG. 2, a cab frame structure for a construction machine typically contains: front pillars 1 that are arranged to stand at left and right sides in front of a cab (a driver seat); roof pillars 2 that are extended from the top ends of the front pillars 1 backwardly and substantially horizontally; rear pillars 3 that are connected to the rear ends of the roof pillars 2 and extended downwardly therefrom; a front header 4 that is arranged to hang between the left and right front pillars 1 in the upper portions of the front pillars 1; and a rear header 5 that is arranged to hang between the left and right rear pillars 3 in the upper portions of the rear pillars 3.

A guide rail 6 is placed in the front pillar 1 and the roof pillar 2. Members to be guided 8 (as one example, a guide roller, a projection and the like) attached to a front window unit 7 are engaged with these guide rails 6. Since the members to be guided 8 are guided by the guide rails 6, the front window unit 7 is moved along the front pillars 1 and the roof pillars 2 and switched between a closed position where the front window unit 7 is supported in a standing state in the front pillars 1 and an opened position where the front window unit 7 is supported in a horizontal state in the roof pillars 2 and consequently opens and closes the front surface of the cab. The front header 4 is arranged coincidentally with the position of the top end of the front window unit 7 set at the closed position.

By the way, as the cab frame structure for the construction machine of this kind, a structure in which, since the front pillar 1 and the roof pillar 2 are configured by one curved tubular material 9, a strength is improved and a good outward appearance is improved is known (refer to a patent document 1).

PRIOR ART DOCUMENT

Patent Document

Patent Document 1: Japanese Patent Application Publication 2004-90039

SUMMARY OF INVENTION

Problems to be Solved by the Invention

When the front pillar 1 and the roof pillar 2 is configured by the one tubular material 9, as shown in FIG. 3A, a curved portion 10 is formed at a portion at which the front pillar 1 and the roof pillar 2 in the tubular material 9 are linked. This curved portion 10 is formed by bending and forming (bending and machining) the linear tubular material (irregularly-shaped steel tube) 9 whose sectional shape is shown, for example, in FIG. 3B. When the tubular material 9 is bent and formed, at the curved portion 10, a curvature radius of a curve outer side 10a becomes larger than a curvature radius of a curve inner side 10b.

When at the curved portion 10, the curvature radius of the curve outer side 10a is larger than the curvature radius of the curve inner side 10b, as shown in FIG. 4, an upper limit position of a top end 7x of the front window unit 7 is limited by a portion of a radius curve end 10x of the curve outer side 10a. Thus, a position of the top end 7x of the front window unit 7 can not be raised while greatly exceeding the portion of the radius curve end 10x. For this reason, an attachment position of the front header 4 arranged coincidentally with the position of the top end 7x of the front window unit 7 can not be raised. Thus, an upward viewing angle (visual elevation angle) θ1 with an eye point of a driver on a driver seat as a standard is limited by the front header 4.

When a curved glass whose top end is curved along the curved portion 10 is used in a glass of the front window unit 7, the position of the top end of the front window unit 7 can be set at a location higher than the radius curve end 10x of the curve outer side 10a in the curved portion 10. Thus, the height of the front header 4 can be raised, thereby enlarging the upward viewing angle θ1 of the driver. However, when the curved glass is used in the front window unit 7, a visual field of the driver is distorted, which may lead to a fear that an accurate work is disturbed. In addition, when the front window unit 7 is moved along the guide rails 6 to the opened position at which the front window unit 7 is horizontally supported by the roof pillars 2, the curved glass of the front window unit 7 interferes with a ceiling board (refer to FIG. 1) 11 placed on the roof pillars 2. For this reason, a flat glass 7g is used in the front window unit 7.

When the flat glass 7g is used in the front window unit 7, as described by using FIG. 4, the upper limit position of the top end 7x of the front window unit 7 is limited to a position at which the above upper limit position is bumped against the portion of the radius curve end 10x of the curve outer side 10a in the curved portion 10. For this reason, the height of the front header 4 arranged coincidentally with the position of the top end 7x of the front window unit 7 is limited. Thus, the upward viewing angle θ1 of the driver is limited by its front header 4.

An object of the present invention proposed by considering the above-mentioned circumstances is to provide a cab frame structure for a construction machine in which in the cab frame structure for the construction machine in which the front pillar and the roof pillar are configured by one tubular material, the attachment position of the front header can be reversibly raised and the upward viewing angle of the driver is enlarged.

Means to Solve the Problems

In order to attain the above-mentioned object, the present invention provides a cab frame structure for a construction machine, characterized in that a front pillar and a roof pillar, which configure a cab frame of the construction machine, are configured by one tubular material having a curved portion at a joint between the front pillar and the roof pillar; by making a curvature radius of a curve outer side in said curved portion in said tubular material smaller than a curvature radius of a curve inner side, a space to raise an accommodation position of a top end of a front window unit supported by said front pillars is formed in said curved portion; and a front header, which is positioned at the top end of said front window unit accommodated in said space, is arranged in the curve outer side in said curved portion.

According to one aspect of the invention, the tubular material has surplus portions in a circumferential direction at a portion of the front pillar and a portion of the roof pillar and has a protrusion protruded to the curve outer side in the curved portion, and a section is gradually changed along a longitudinal direction.

According to another aspect of the invention in the tubular material, a circumferential length of the portion of the front pillar, a circumferential length of the portion of the roof pillar and a circumferential length of the curved portion are equal.

According to another aspect of the invention, the front window unit has a member to be guided which is engaged with a guide rail placed in the tubular material, and can be moved along the tubular material.

According to another aspect of the invention, the guide rail is formed in the surplus portion.

According to another aspect of the invention, the front window unit has a flat glass.

Advantageous Effects of the Invention

According to the cab frame structure for the construction machine (1) According to the present invention, by making the curvature radius of the curve outer side in the curved portion of the one tubular material, which configures the front pillar and the roof pillar, smaller than the curvature radius of the curve inner side, the space to raise the accommodation position of the top end of the front window unit is formed in the curved portion, and the front header is arranged at the position of the top end of the front window unit accommodated in the space. Thus, it is possible to reversibly raise the attachment position of the front header, and it is possible to enlarge the upward viewing angle of the driver.

(2) According to one aspect of the present invention, the tubular material has the surplus portions at the portion of the front pillar and the portion of the roof pillar and also has the protrusion protruded to the curve outer side in the curved portion, and the section is gradually changed along the longitudinal direction. Thus, from the one tubular material, the curved portion in which the curvature radius of the curve outer side is smaller than the curvature radius of the curve inner side can be accurately formed.

(3) According to another aspect of the present invention, the circumferential length of the portion of the front pillar, the circumferential length of the portion of the roof pillar and the circumferential length of the curved portion are equal. Thus, when the curved portion is formed from the one tubular material, the extension or contraction in a circumferential direction of the tubular material can be suppressed.

(4) According to another aspect of the present invention, the member to be guided in the front window unit is engaged with the guide rail placed in the tubular material and can be moved along the tubular material and can open the front surface of the cab. Thus, the driver can directly visibly view a target without viewing the target through the glass, and the attachment position of the front header can be reversibly raised, which can enlarge the upward viewing angle of the driver.

(5) According to another aspect of the present invention, the guide rail is formed in the surplus portion. Thus, as compared with the case in which the guide rail and the surplus portion are separately formed, the attainment of the lower cost can be promoted.

(6) According to another aspect of the present invention, the front window unit has the flat glass. Thus, differently from the curved glass, any distortion is not generated in the visible field of the driver. Hence, the driver can view the target without any distortion, and the attachment position of the front header can be reversibly raised, which can enlarge the upward viewing angle of the driver.

FIG. 3A and FIG. 3B are explanatory views showing a conventional example, wherein FIG. 3A is a side view showing a portion of a front pillar, a portion of a roof pillar and a curved portion, in one tubular material that configures a part of a cab frame, and FIG. 3B is a sectional view from a b-b line in FIG. 3A.

FIG. 7A, FIG. 7B and FIG. 7C are explanatory views showing a first modified embodiment of the present invention, wherein FIG. 7A is a side view of a portion of a front pillar, a portion of a roof pillar and a curved portion in a tubular material, FIG. 7B is a sectional view from a b-b line in FIG. 7A, and FIG. 7C is a sectional view from a c-c line in FIG. 7A.

FIG. 8A, FIG. 8B and FIG. 6C are explanatory views showing a second modified embodiment of the present invention, wherein FIG. 8A is a side view of a portion of a front pillar, a portion of a roof pillar and a curved portion in a tubular material, FIG. 8B is a sectional view from a b-b line in FIG. 8A.

FIG. 9A and FIG. 9B are explanatory views showing a comparison example that is not an embodiment of the present invention, wherein FIG. 9A is a side view of a portion of a front pillar, a portion of a roof pillar and a curved portion in a tubular material, and FIG. 9B is a sectional view from a b-b line in FIG. 9A.

DESCRIPTION OF EMBODIMENTS

The preferable embodiment of the present invention will be described below on the basis of the attached drawings.

Figure 5:
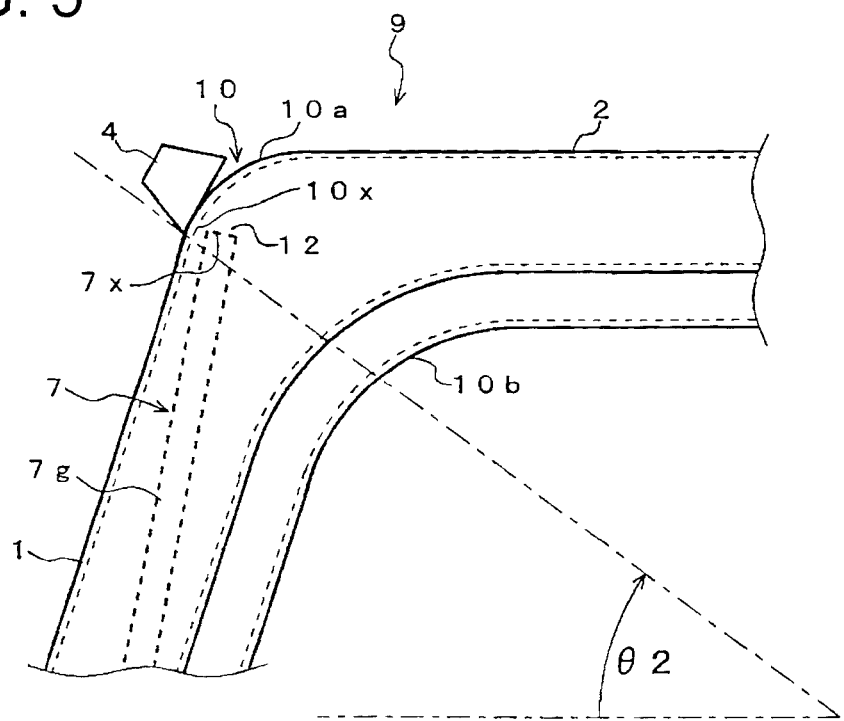
FIG. 5 is an explanatory view showing an embodiment of the present invention and a side view of the portion of the front pillar, the portion of the roof pillar and the curved portion in the tubular material, and the front window unit and the front header.

As shown in FIG. 5, in a cab frame structure for a construction machine according to this embodiment, those front pillar 1 and roof pillar 2, which configure the cab frame, are configured by one tubular material 9 that has the curved portion 10 at the joint between the front pillar 1 and the roof pillar 2. Thus, this has the same configuration elements as the cab frame structure for the construction machine already described by using FIG. 1 and FIG. 2. Then, the same symbols are assigned to the same configuration elements, and their explanations are omitted. Then, only differences, namely, features are explained.

The feature of the cab frame structure according to this embodiment lies in a configuration in which as shown in FIG. 5, by making the curvature radius of the curve outer side 10a in the curved portion 10 in the tubular material 9 smaller than the curvature radius of the curve inner side 10b, the space 12 to raise the accommodation position of the top end 7x of the front window unit 7 is formed in the curved portion 10, and the front header 4 is arranged coincidentally with the position of the top end 7x of the front window unit 7 accommodated in the space 12. Consequently, the attachment position of the front header 4 can be raised over the conventional example shown in FIG. 4. Thus, an upward viewing angle θ2 of the driver can be made wider than the upward viewing angle θ1 of the conventional example shown in FIG. 4. This configuration will be described below in detail.

At first, for the glass of the front window unit 7, as mentioned above, in order to suppress the distortion in the visible field of the driver on the driver seat, the flat glass 7g that is not a curved glass is used. For this reason, the upper limit position of the top end 7x in the front window unit 7 is limited to a height at which the above upper limit position is bumped against the portion of the radius curve end 10x of the curve outer side 10a in the curved portion 10. As a result, the front header 4 arranged coincidentally with the position of the top end 7x of the front window unit 7 is arranged at the portion of the radius curve end 10x in the curve outer side 10a in the curved portion 10, even in this embodiment shown in FIG. 5 and the conventional example shown in FIG. 4.

Figure 4:
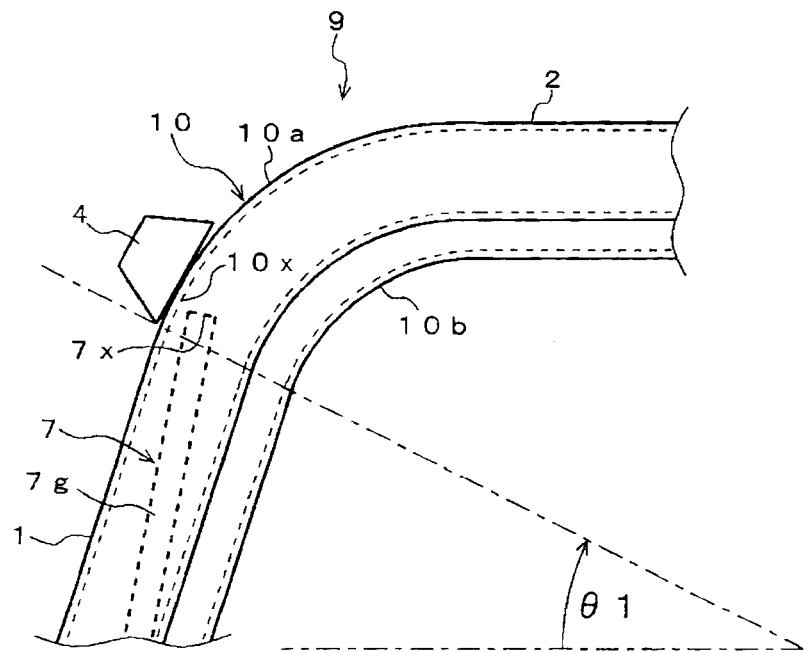
FIG. 4 is an explanatory view showing the conventional example and a side view of a portion of the front pillar, a portion of the roof pillar and the curved portion in the tubular material, and a front window unit and a front header.

Here, in this embodiment in which as shown in FIG. 5, the curvature radius of the curve outer side 10a in the curved portion 10 is smaller than the curvature radius of the curve inner side 10b, the position of the portion of the radius curve end 10x of the curve outer side 10a is high, as compared with the conventional example in which as shown in FIG. 4, the curvature radius of the curve outer side 10a in the curved portion 10 is larger than the curvature radius of the curve inner side 10b. For this reason, with regard to the height of the front header 4 arranged at the portion of the radius curve end 10x, this embodiment shown in FIG. 5 is higher than the conventional example shown in FIG. 4. Thus, the upward viewing angle θ2 of the driver in this embodiment shown in FIG. 5 is wider than the upward viewing angle θ1 of the conventional example shown in FIG. 4.

Figure 6A:
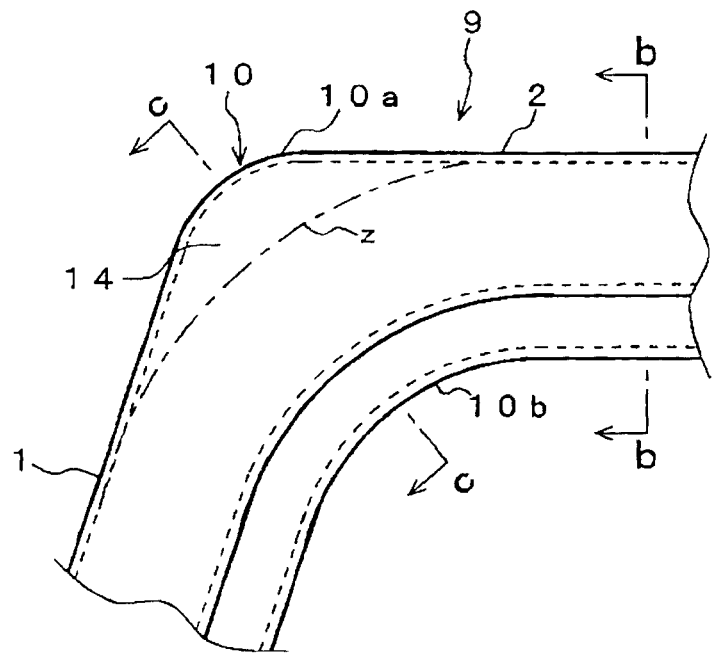
FIG. 6A is a partially enlarged view of FIG. 5.
Figure 6B:
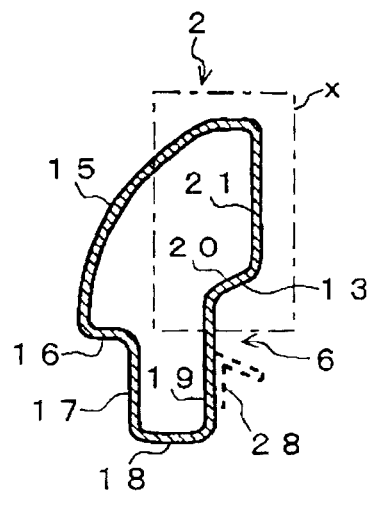
FIG. 6B is a sectional view from a b-b line in FIG. 6A.
Figure 6C:
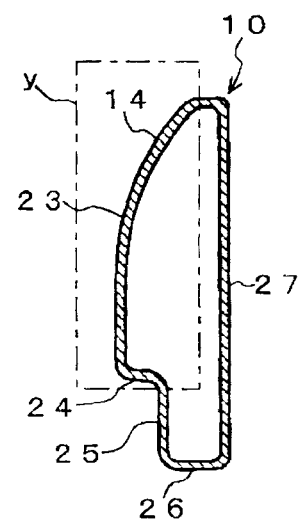
FIG. 6C is a sectional view from a c-c line in FIG. 6A.

As shown in FIG. 6A, the tubular material 9 having the foregoing curved portion 10 has the surplus portion 13 in the circumferential direction at the portion of the roof pillar 2 as shown in FIG. 6B, and has the protrusion 14 protruded to the curve outer side at the curved portion 10 as shown in FIG. 6C and has the surplus portion 13, which is similar to that shown in FIG. 6B, at the portion of the front pillar 1 although this is not shown. Then, the section is gradually changed along a longitudinal direction. With such a configuration, by forming the one tubular material 9, it is possible to accurately form the curved portion 10 in which the curvature radius of the curve outer side 10a is smaller than the curvature radius of the curve inner side 10b.

That is, the tubular material 9 having the curved portion 10 shown in FIG. 6A is obtained by forming (deforming) the tubular material (linear differently-shaped steer tube) whose section is shaped to have the stage-shaped surplus portion 13 in the circumferential direction as shown in FIG. 6B. However, at this time of forming, the surplus portion 13 is protruded to the curve outer side 10a and made serve as the protrusion 14 of the curved portion 10. Specifically, in the tubular material 9 shown in FIG. 6A, FIG. 6B and FIG. 6C, a convex circumferential length portion (the portion including the surplus portion 13) shown within a virtual line x in FIG. 6B is moved to the portion (the portion including the protrusion 14) shown within a virtual line y in FIG. 6B. Consequently, it is possible to accurately form the curved portion 10 in which the curvature radius of the curve outer side 10a is smaller than the curvature radius of the curve inner side 10b.

A virtual line z in FIG. 6A is such that a concentric circle with the radius of the curve inner side 10b is drawn in the curve outer side 10a in the curved portion 10. Usually, when the tubular material is bent and formed (bent and machined), the tubular material seems to exhibit the radius of this virtual line z in the curve outer side 10a in the curved portion 10, and the curvature radius of the curve outer side 10a becomes larger than the curvature radius of the curve inner side 10b. On the contrary, in this embodiment, as shown in FIG. 6B, the tubular material (the linear tubular material) whose section is shaped to have the stage-shaped surplus portion 13 in the circumferential direction is formed (deformed), and at that time, the surplus portion 13 is protruded to the curve outer side 10a and made serve as the protrusion 14 of the curved portion 10. Consequently, as shown by a solid line in FIG. 6A, the curvature radius of the curve outer side 10a in the curved portion 10 is made smaller than the curvature radius of the curve inner side 10b.

In the tubular material 9 shown in FIG. 6A, FIG. 6B and FIG. 6C, a circumferential length of the portion of the front pillar 1, a circumferential length of the portion of the roof pillar 2 and a circumferential length of the curved portion 10 are equal to each other. Consequently, when the linear tubular material is formed (deformed) to form the curved portion 10, the circumferential extension or contraction of the tubular material can be suppressed, thereby enabling the curved portion 10 in which the curvature radius of the curve outer side 10a is smaller than the curvature radius of the curve inner side 10b to be formed reasonably and accurately. By the way, the meaning that "the circumferential length is equal to" in this case indicates a concept of including a state that "the circumferential length is approximately equal to" in which there are some circumferential length differences inevitably generated when the tubular material is formed (deformed).

Figure 2:
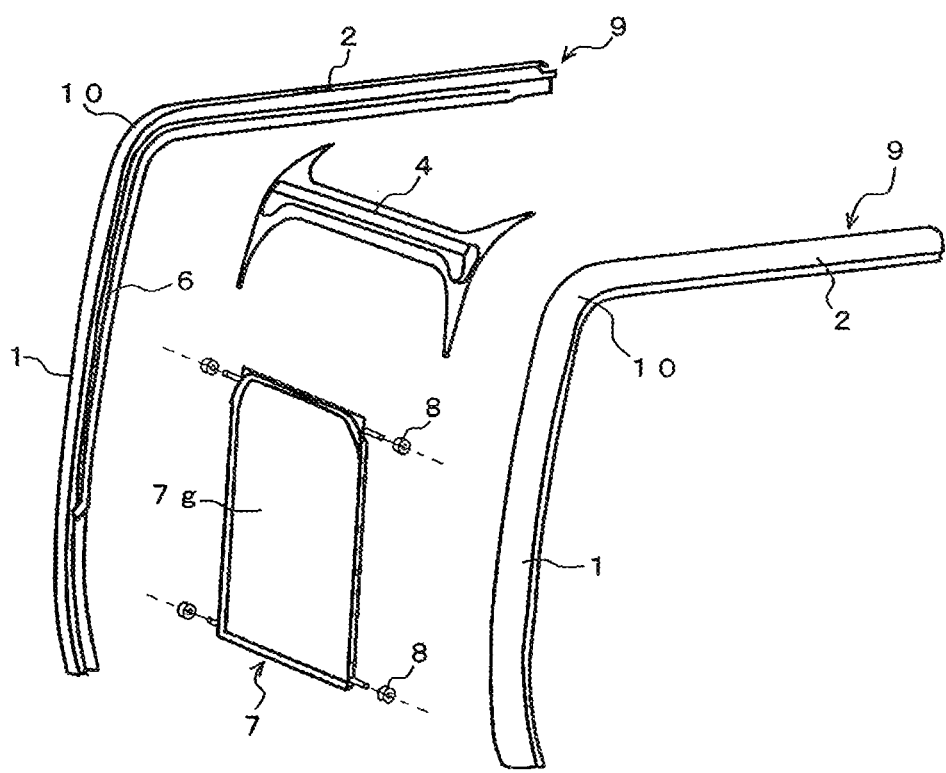
FIG. 2 is an exploded perspective view showing a main portion of the cab frame structure for the construction machine.
Figure 3A:
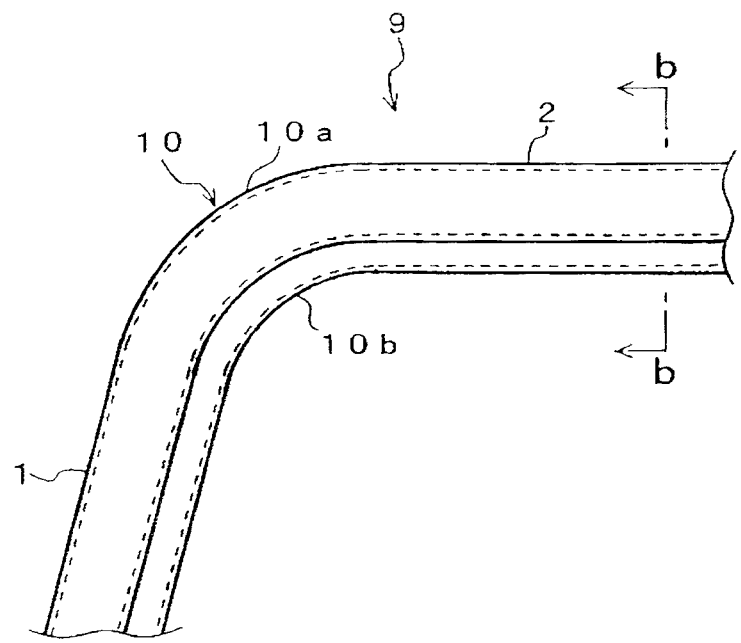
Figure 3B:
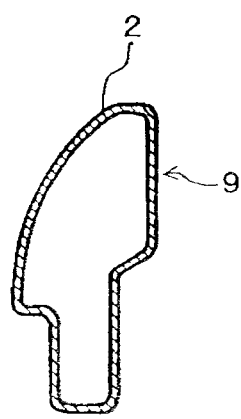

As shown in FIG. 2, the front window unit 7 has the members to be guided 8 (as one example, guide rollers, projections and the like) engaged with the guide rails 6 placed in the tubular materials 9 and can be moved along the tubular materials 9. Since the members to be guided 8 are guided by the guide rails 6, the front window unit 7 is moved along the front pillars 1 and the roof pillars 2 and switched between the closed position where the front window unit 7 is supported in the standing state in the front pillars 1 and the opened position where the front window unit 7 is supported in the horizontal state in the roof pillars 2 and consequently opens and closes the front surface of the cab. Since the front surface of the cab is opened, the driver inside the cab can carry out an accurate work while directly viewing a target without viewing the target through the glass. In addition, the attachment position of the front header 4 can be reversibly raised, which can enlarge the upward viewing angle θ2 of the driver.

The guide rail 6 may be formed in the surplus portion 13 shown in FIG. 6B. Then, a case of forming the guide rail 6 in the surplus portion 13 will be described below.

Figure 1:
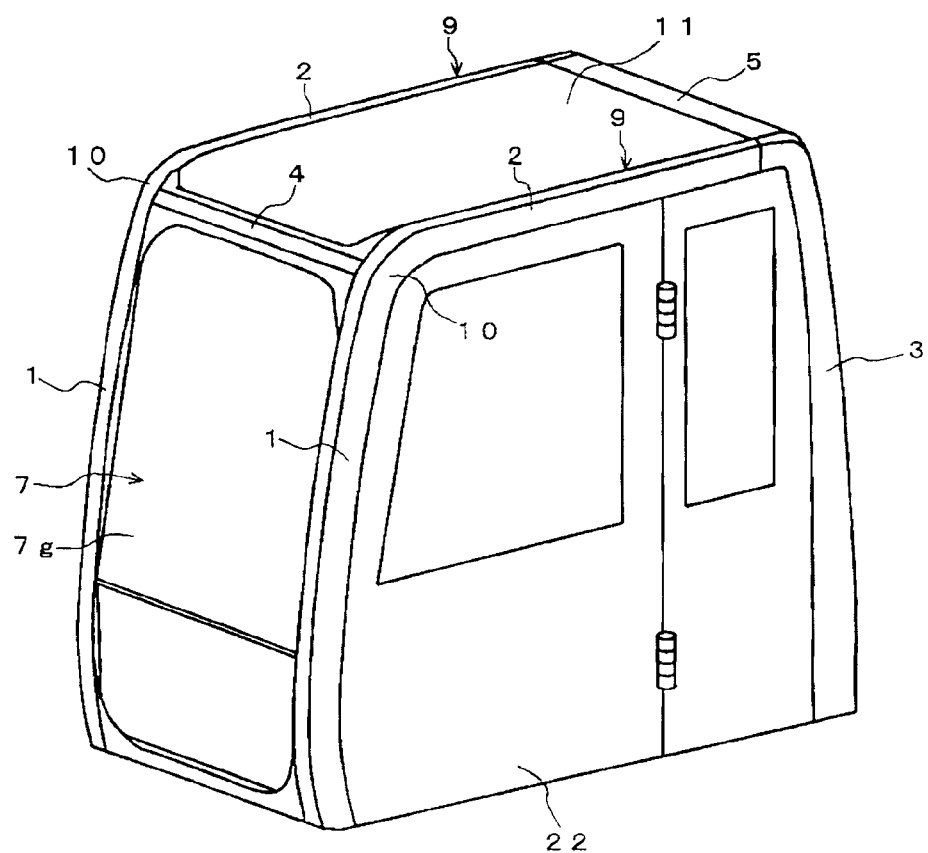
FIG. 1 is a perspective view showing a schema of a cab frame structure for a construction machine.

As shown in FIG. 6B, the portion of the roof pillar 2 in the tubular material 9 (the portion of the front pillar 1 is also similar) has: an outer curved portion 15; an outer stage portion 16 that extends from a lower end of the outer curved portion 15 to the inside of the cab at an approximately right angle; an outer flat portion 17 that extends downwardly from the outer stage portion 16 at an approximately right angle; a lower flat portion 18 that extends inwardly from the outer flat portion 17 at an approximately right angle; an inner lower flat portion 19 that extends upwardly from the lower flat portion 18 at an approximately right angle; an inner stage portion 20 that extends from the inner lower flat portion 19 inwardly and obliquely upwardly; and an inner upper flat portion 21 that extends upwardly from the inner stage portion 20 and links to the outer curved portion 15. Edges of a side door 22 shown in FIG. 1 are accommodated in the portions of the outer stage portion 16 and the outer flat portion 17.

As shown in FIG. 6C, the curved portion 10 in the tubular material 9 has: an outer curved portion 23 that configures the protrusion 14; an outer stage portion 24 that extends from a lower end of the outer curved portion 23 to the inside of the cab at an approximately right angle; an outer flat portion 25 that extends downwardly from the outer stage portion 24 at an approximately right angle; a lower flat portion 26 that extends inwardly from the outer flat portion 25 at an approximately right angle; and an inner flat portion 27 that extends upwardly from the lower flat portion 26 at an approximately right angle and links to an outer curved portion 14. The edges of the side door 22 shown in FIG. 1 are accommodated in the portions of the outer stage portion 24 and the outer flat portion 25.

As can be understood when comparing FIG. 6C(c) with FIG. 6B, the inner stage portion 20 in the portion of the roof pillar 2 in the tubular material 9 (the portion of the front pillar 2 is also similar) mainly configures the surplus portion 13. Also, this inner stage portion 20, namely, the surplus portion 13 can be doubly used as a part of the guide rail 6. That is, as shown in FIG. 6B, by attaching a steel material 28 whose section is of chevron (an angle steel whose apex is acutely angled) to the inner lower flat portion 19, the guide rail 6 can be configured by the angle steel 28 and the inner stage portion 20.

The members to be guided 8 of the front window unit 7 shown in FIG. 2 are engaged with these guide rails 6 and guided along the longitudinal direction of the tubular materials 9. In this case, since the angle steel 28 and the inner stage portion 20 are inclined, a taper roller, a taper-shaped projection or the like which coincides with the inclination may be used in the member to be guided 8. In this way, the part of the guide rail 6 is formed in the surplus portion 13, and they are used doubly as the function of the guide rail 6. Consequently, the attainment of a lower cost can be promoted compared with a case in which the surplus portion 13 and the guide rail 6 are perfectly separately formed.

Figure 7A:
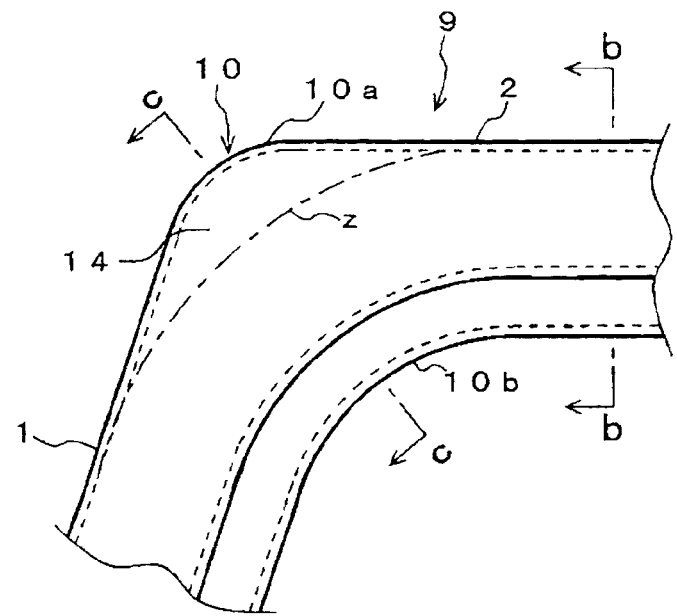
Figure 7B:
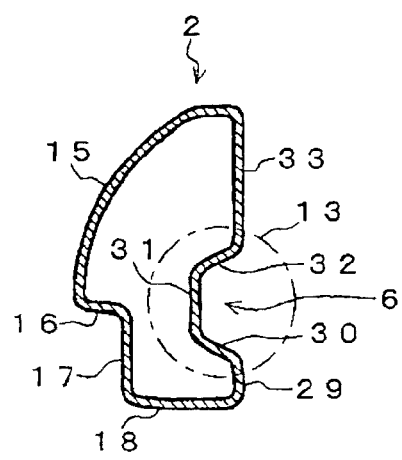
Figure 7C:
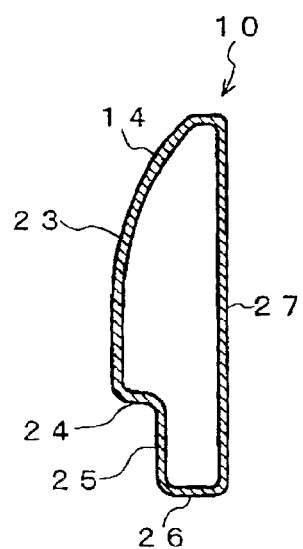

FIG. 7A, FIG. 7B and FIG. 7C show a first modified embodiment of the present invention.

In a cab frame structure for a construction machine according to this first modified embodiment, its basic configuration is equal to the cab frame structure for the construction machine of the previous embodiment already described by using FIG. 5 and FIG. 6A, FIG. 6B and FIG. 6C and the like. As can be understood when comparing FIG. 6B with FIG. 7B, only the sectional shape of the portion of the roof pillar 2 in the tubular material 9 shown in FIG. 6B (the portion of the front pillar 1 is also similar) differs from the previous embodiment. Thus, only its difference is explained. Then, the same symbols are assigned to the other same configuration elements, and their explanations are omitted.

As shown in FIG. 7B, the portion of the roof pillar 2 in this tubular material 9 (the portion of the front pillar 1 is also similar) has: the outer curved portion 15; the outer stage portion 16 that extends from the lower end of the outer curved portion 15 to the inside of the cab at the approximately right angle; the outer flat portion 17 that extends downwardly from the outer stage portion 16 at the approximately right angle; the lower flat portion 18 that extends inwardly from the outer flat portion 17 at the approximately right angle; an inner lower flat portion 29 that extends upwardly from the lower flat portion 18 at the approximately right angle; an inner lower stage portion 30 that extends from the inner lower flat portion 29 outwardly and obliquely upwardly; an inner middle flat portion 31 that extends upwardly from the inner lower stage portion 30; an inner upper stage portion 32 that extends from the inner middle flat portion 31 inwardly and obliquely upwardly; and an inner upper flat portion 33 that extends upwardly from the inner upper stage portion 32 and links to the outer curved portion 15.

As can be understood when comparing FIG. 7B with FIG. 7C, in this first modified embodiment, the inner lower stage portion 30 and the inner upper stage portion 32 mainly configure the surplus portion 13. Also, the inner lower stage portion 30 and the inner upper stage portion 32 are used doubly as the guide rail 6. The member to be guided 8 of the front window unit 7 shown in FIG. 2 is accommodated between the inner lower stage portion 30 and the inner upper stage portion 32 that are shown in FIG. 7C and guided by them. Consequently, the front window unit 7 is moved along the tubular materials 9, and the front surface of the cab is opened or closed. The guide rail 6 is formed in the surplus portion 13. Thus, as compared with the case in which the surplus portion 13 and the guide rail 6 are separately formed, the attainment of the lower cost can be promoted. Since the basic action effect of this first modified embodiment is similar to the previous embodiment, its explanation is omitted.

Figure 8A:
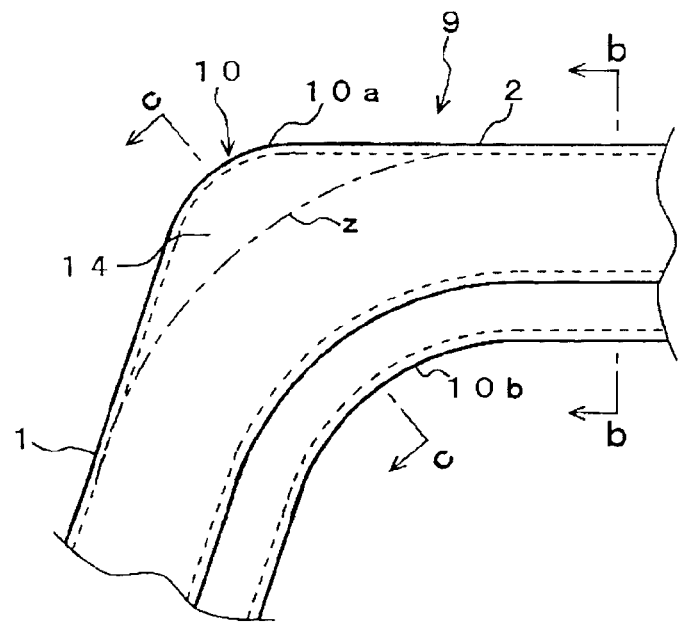
Figure 8B:
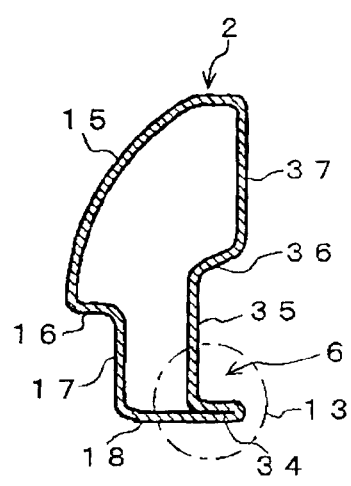
Figure 8C:
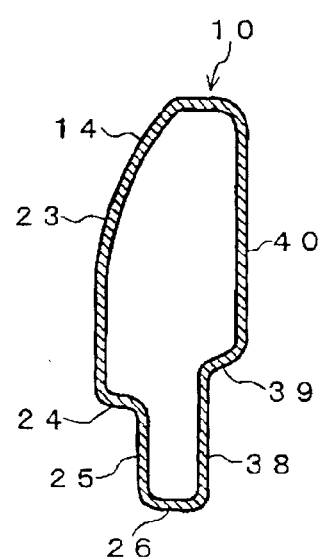
FIG. 8C is a sectional view from a c-c line in FIG. 8A.

FIG. 8A, FIG. 8B and FIG. 8C show a second modified embodiment of the present invention.

In a cab frame structure for a construction machine according to this second modified embodiment, its basic configuration is equal to the cab frame structure for the construction machine of the first embodiment already described by using FIG. 5 and FIG. 6A, FIG. 6B and FIG. 6C and the like. As can be understood when comparing FIG. 6B with FIG. 8B and when comparing FIG. 6C with FIG. 8C, only the sectional shape of the portion of the roof pillar 2 in the tubular material 9 shown in FIG. 6B (the portion of the front pillar 1 is also similar) and the sectional shape of the curved portion 10 shown in FIG. 6C differ from the first embodiment. Thus, only their differences are explained. Then, the same symbols are assigned to the other same configuration elements, and their explanations are omitted.

As shown in FIG. 8B, the portion of the roof pillar 2 in this tubular material 9 (the portion of the front pillar 1 is also similar) has: the outer curved portion 15; the outer stage portion 16 that extends from the lower end of the outer curved portion 15 to the inside of the cab at the approximately right angle; the outer flat portion 17 that extends downwardly from the outer stage portion 16 at the approximately right angle; the lower flat portion 18 that extends inwardly from the outer flat portion 17 at the approximately right angle; a turn-back portion 34 that is turned back at 180 degrees from the lower flat portion 18; an inner lower flat portion 35 that extends upwardly from the turn-back portion 34 at an approximately right angle; an inner stage portion 36 that extends from the inner lower flat portion 35 outwardly and obliquely upwardly; and an inner upper flat portion 37 that extends upwardly from the inner stage portion 36 and links to the outer curved portion 15.

As shown in FIG. 8C, the curved portion 10 in the tubular material 9 has the outer curved portion 23 that configures the protrusion 14, the outer stage portion 24 that extends from the lower end of the outer curved portion 23 to the inside of the cab at the approximately right angle, the outer flat portion 25 that extends downwardly from the outer stage portion 24 at the approximately right angle, the lower flat portion 26 that extends inwardly from the outer flat portion 25 at the approximately right angle, an inner lower flat portion 38 that extends upwardly from the lower flat portion 26 at an approximately right angle, an inner stage portion 39 that extends from the inner lower flat portion 38 inwardly and obliquely upwardly, and an inner upper flat portion 40 that extends upwardly from the inner stage portion 39 and links to the outer curved portion 23.

As can be understood when comparing FIG. 8B with FIG. 8C, in the second modified embodiment, the turn-back portion 34 in the portion of the roof pillar 2 in the tubular material 9 (the portion of the front pillar 1 is also similar) mainly configures the surplus portion 13. Also, this turn-back portion 34, namely, the surplus portion 13 is used doubly as the guide rail 6. The member to be guided 8 of the front window unit 7 is accommodated between the turn-back portion 34 and the inner stage portion 36 that are shown in FIG. 8B. In this way, the guide rail 6 is formed in the surplus portion 13. Thus, as compared with the case in which the surplus portion 13 and the guide rail 6 are separately formed, the attainment of the lower cost can be promoted. Since the basic action effect of this second modified embodiment is similar to the first embodiment, its explanation is omitted.

In the above-mentioned respective embodiments, by forming (deforming) the linear tubular material having the standard section shown in FIG. 6B, FIG. 7B or FIG. 8B, the surplus portion 13 formed in the basic section is protruded to the curve outer side 10a in the curved portion 10 and made serve as the protrusion 14. In those embodiments, such as the inner stage portion 20 shown in FIG. 6B, the inner lower stage portion 30 and the inner upper stage portion 32 shown in FIG. 7B and the turn-back portion 34 shown in FIG. 8B, in addition to the type in which the shape functioning as the guide rail 6 in the basic section is used as the surplus portion 13, a type in which an additional shape is added to the basic section and then it is used as the surplus portion 13 is also considered.

Figure 9A:
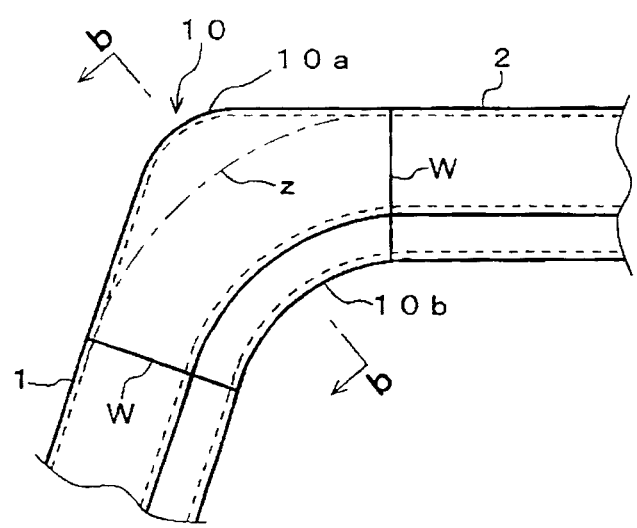
Figure 9B:
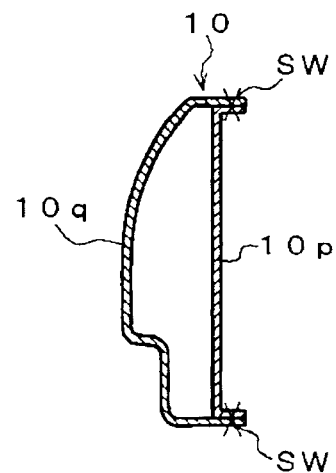

By the way, as shown in FIG. 9A, the front pillar 1, the curved portion 10 and the roof pillar 2 are defined as respective different parts, differently from the present invention in which they are configured by the one tubular material. Then, as shown in FIG. 9B, even if the curved portion 10 is configured as a hollow body formed by spot-welding an inner panel 10p and an outer panel 10q, the curvature radius of the curve outer side 10a in the curved portion 10 can be made smaller than the curvature radius of the curve inner side 10b.

However, in this case, the hollow body constituting the curved portion 10 has a panel structure in which their configuration elements are welded at only spot welded portions SW. Thus, its strength is weak over an integrated member. Also, the front pillar 1 (the tubular material), the curved portion 10 (the hollow body of the panel structure) and the roof pillar 2 (the hollow body) are required to be welded at joints. Thus, the good outward appearance of a welded junction (welded portion W) is poor, and the strength drop in the welded portion W can not be avoided. Also, since welding distortion is generated, a precision is not stable, which causes the assembly performance to a cab frame to be inferior. In addition, because of an assembly structure in which a plurality of parts are assembled, the number of assembling steps is increased, which leads to a cost increase.

On the other hand, in the respective embodiments of the present invention as mentioned above, by forming the one tubular material, the front pillar 1, the curved portion 10 and the roof pillar 2 are integrally configured. Thus, the welded portion W and the spot welded portion SW that are required in a division panel type in FIG. 9A, and FIG. 9B do not exist, which can provide the cab (cab frame) that is superior in strength. Also, since there is not any welding distortion, the precision is stable, and the assembly performance to the cab frame is excellent. Since the welded portion W and the spot welded portion SW do not exist, a grinder process for finishing them is not required, which makes the good outward appearance better. The number of steps related to the assembling work for the cab frame can be decreased, which can promote the cost decrease.

The present invention is not limited to the above-mentioned respective embodiments. In the range without departing from the inventions described in claims, various embodiments are included.

The invention claimed is:

1. A cab frame structure for a construction machine, characterized in that
   the cab frame includes one continuous tubular material configured to have a front pillar portion and a roof pillar portion joined together by a curved portion;
   wherein the curved portion is configured to include a curve outer side having one curvature radius and a curve inner side having other curvature radius, the one curvature radius of the curve outer side in said curved portion in said tubular material being smaller than the other curvature radius of the curve inner side in said tubular material,
   wherein the curved portion is further configured to have a space to accommodate the raised position of a top end of a front window unit supported by said front portion; and
   the cab frame further includes a front header, which is positioned at the top end of said front window unit accommodated in said space, arranged in the curve outer side in said curved portion.

2. The cab frame structure for the construction machine as claimed in claim 1, wherein said tubular material has surplus portions in a circumferential direction at a portion of the front pillar and a portion of the roof pillar and has a protrusion protruded to the curve outer side in said curved portion, and a section is gradually changed along a longitudinal direction.

3. The cab frame structure for the construction machine as claimed in claim 1, wherein in said tubular material, a circumferential length of the portion of said front pillar, a circumferential length of the portion of said roof pillar and a circumferential length of said curved portion are equal.

4. The cab frame structure for the construction machine as claimed in claim 2, wherein in said tubular material, a circumferential length of the portion of said front pillar, a circumferential length of the portion of said roof pillar and a circumferential length of said curved portion are equal.

5. The cab frame structure for the construction machine as claimed in claim 1, wherein said front window unit has a member to be guided which is engaged with a guide rail placed in said tubular material, and can be moved along said tubular material.

6. The cab frame structure for the construction machine as claimed in claim 2, wherein said front window unit has a member to be guided which is engaged with a guide rail placed in said tubular material, and can be moved along said tubular material.

7. The cab frame structure for the construction machine as claimed in claim 3, wherein said front window unit has a member to be guided which is engaged with a guide rail placed in said tubular material, and can be moved along said tubular material.

8. The cab frame structure for the construction machine as claimed in claim 4, wherein said front window unit has a member to be guided which is engaged with a guide rail placed in said tubular material, and can be moved along said tubular material.

9. The cab frame structure for the construction machine as claimed in claim 6, wherein said guide rail is formed in said surplus portion.

10. The cab frame structure for the construction machine as claimed in claim 1, wherein said front window unit has a flat glass.

11. The cab frame structure for the construction machine as claimed in claim 2, wherein said front window unit has a flat glass.

12. The cab frame structure for the construction machine as claimed in claim 3, wherein said front window unit has a flat glass.

13. The cab frame structure for the construction machine as claimed in claim 4, wherein said front window unit has a flat glass.

14. The cab frame structure for the construction machine as claimed in claim 5, wherein said front window unit has a flat glass.

15. The cab frame structure for the construction machine as claimed in claim 6, wherein said front window unit has a flat glass.

16. The cab frame structure for the construction machine as claimed in claim 7, wherein said front window unit has a flat glass.

17. The cab frame structure for the construction machine as claimed in claim 8, wherein said front window unit has a flat glass.

18. The cab frame structure for the construction machine as claimed in claim 9, wherein said front window unit has a flat glass.

* * * * *